(12) United States Patent
Lee (10) Patent No.: US 10,165,311 B2
(45) Date of Patent: Dec. 25, 2018

(54) NON-TRANSITORY COMPUTER-READABLE RECORDING MEDIUM HAVING PROGRAM RECORDED THEREIN FOR PROVIDING NETWORK-ADAPTIVE CONTENT AND APPARATUS FOR PROVIDING NETWORK-ADAPTIVE CONTENT

(71) Applicant: SK Telecom Co., Ltd., Seoul (KR)

(72) Inventor: Jongmin Lee, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

(21) Appl. No.: 15/622,665

(22) Filed: Jun. 14, 2017

(65) Prior Publication Data

US 2017/0280177 A1 Sep. 28, 2017

Related U.S. Application Data

(63) Continuation of application No. PCT/KR2016/001458, filed on Feb. 13, 2016.

(30) Foreign Application Priority Data

Feb. 13, 2015 (KR) .................. 10-2015-0022326

(51) Int. Cl.
*H04N 7/16* (2011.01)
*H04N 21/236* (2011.01)
(Continued)

(52) U.S. Cl.
CPC ... *H04N 21/23605* (2013.01); *H04N 21/2353* (2013.01); *H04N 21/2381* (2013.01);
(Continued)

(58) Field of Classification Search
CPC ......... H04N 21/23605; H04N 21/2353; H04N 21/53614; H04N 21/4334; H04N 21/6131; H04N 21/854
See application file for complete search history.

(56) References Cited

U.S. PATENT DOCUMENTS

2013/0080579 A1* 3/2013 Gordon ................ H04L 65/608
709/217
2013/0258946 A1* 10/2013 Yie ....................... H04W 80/06
370/328

(Continued)

FOREIGN PATENT DOCUMENTS

KR 10-2013-0108198 A 10/2013
KR 10-2013-0116157 A 10/2013

(Continued)

OTHER PUBLICATIONS

International Search Report for PCT/KR2016/001458 dated Jun. 29, 2016.

*Primary Examiner* — John R Schnurr
(74) *Attorney, Agent, or Firm* — Hauptman Ham, LLP (57) ABSTRACT

The disclosure relates to a computer-readable recording medium having a program recorded therein for providing network-adaptive content and a related apparatus. The disclosure allows streaming content to be provided to a user terminal in view of a difference in transmission quality of communication networks by analyzing a source address of a signaling message transmitted to the user terminal, identifying the type of a communication network accessed by the user terminal, differently setting media transmission parameters for encapsulation and packetization in accordance with the identified network type, and performing encapsulation and packetization in accordance with the set media transmission parameters.

8 Claims, 6 Drawing Sheets

(51) Int. Cl.
*H04N 21/235* (2011.01)
*H04N 21/433* (2011.01)
*H04N 21/61* (2011.01)
*H04N 21/854* (2011.01)
*H04N 21/238* (2011.01)
*H04N 21/2381* (2011.01)
*H04N 21/24* (2011.01)
*H04N 21/658* (2011.01)

(52) U.S. Cl.
CPC . *H04N 21/23614* (2013.01); *H04N 21/23805* (2013.01); *H04N 21/2401* (2013.01); *H04N 21/2402* (2013.01); *H04N 21/4334* (2013.01); *H04N 21/6131* (2013.01); *H04N 21/6582* (2013.01); *H04N 21/854* (2013.01)

(56) References Cited

U.S. PATENT DOCUMENTS

2014/0314157 A1* 10/2014 Hwang .................. H04N 19/89
 375/240.27
2014/0379903 A1* 12/2014 Bouazizi ........... H04L 29/06027
 709/224
2015/0032845 A1* 1/2015 Bouazizi ................ H04L 67/06
 709/217

FOREIGN PATENT DOCUMENTS

| KR | 10-1491639 B1 | 2/2015 |
| WO | 2013/187667 A1 | 12/2013 |
| WO | 2014/116060 A1 | 7/2014 |

\* cited by examiner

NON-TRANSITORY COMPUTER-READABLE RECORDING MEDIUM HAVING PROGRAM RECORDED THEREIN FOR PROVIDING NETWORK-ADAPTIVE CONTENT AND APPARATUS FOR PROVIDING NETWORK-ADAPTIVE CONTENT

CROSS-REFERENCE TO RELATED APPLICATIONS

The present application is a continuation of International Patent Application No. PCT/KR2016/001458, filed on Feb. 13, 2016, which is based upon and claims the benefit of priority to Korean Patent Application No. 10-2015-0022326, filed on Feb. 13, 2015. The disclosures of the above-listed applications are hereby incorporated by reference herein in their entirety.

TECHNICAL FIELD

The disclosure relates to streaming-type content providing technology and, more particularly, to an apparatus for providing network-adaptive content and a non-transitory computer-readable recording medium in which a program for providing network-adaptive content is recorded.

BACKGROUND ART

Moving picture experts group (MPEG)-2 transport stream (TS) is a communication protocol for transmitting multimedia-related data including audio, video, data, and the like through a network. MPEG-2 TS is used for transmission of media data in terrestrial/satellite digital broadcasting, digital multimedia broadcasting (DMB), internet protocol television (IPTV), and the like, and also used for storing media in a digital video camera or a Blu-ray device.

However, as the broadcasting network and the communication network gradually converge and become advanced, new generation contents such as ultra high definition (UHD) video contents and 3-dimensional (3D) video contents and new services such as N-screen service are emerging in these days. As a result, new and various requirements arise.

Therefore, as the first part of MPEG-H (High Efficiency Coding and Media Delivery in Heterogeneous Environments) standard to provide various services such as digital broadcasting in various kinds of broadband communication networks, MPEG media transport (MMT) technology is being developed.

The MMT technology aims at providing functions of efficient multimedia data transmission and playback in various network environments that are being advanced. The MMT technology mainly includes a media processing unit (MPU) function area, a signaling function area, a delivery function area, and a presentation information area.

As an example of various network environments, user terminals that request media contents may access various kinds of networks such as a 3G mobile communication network, a 4G mobile communication network, a Wi-Fi network, a wired network, and the like, depending on their terminal types. Also, even the same user terminal may change accessing networks, e.g., from the 4G mobile communication network to the W-Fi network, depending on its location.

In addition, according to recent services, a user who is using specific content through a mobile communication terminal while moving may continuously use the same content through another user terminal, for example, a smart TV. Namely, in order to provide the same content, the user terminals as well as the networks may be changed.

In consideration of such network environments and service environments, effective transmission and playback of multimedia data may require data transmission in a suitable form according to the type of network connected to each user terminal. Further, even in case of the same user terminal, network-adaptive content transmission suitable for the network type is required during a service in view of a change of the network type caused by movement of the user terminal.

SUMMARY

The disclosure proposed to solve the above demands is to implement a non-transitory computer-readable recording medium having a program recorded therein for providing network-adaptive content and also implement an apparatus for providing network-adaptive content by identifying a network type and then applying media transmission parameters suitable for the identified network type in transmission of contents in a streaming manner so as to prevent a degradation of service quality due to a difference in transmission quality depending on network types.

In order to accomplish the above objects, a non-transitory computer-readable recording medium according to the disclosure has a program recorded therein for providing network-adaptive content, the program comprising steps of identifying a type of a communication network connected to a user terminal; setting media transmission parameters for encapsulation and packetization of multimedia data, depending on the identified network type; encapsulating the multimedia data into a media processing unit (MPU) by applying the media transmission parameters and packetizing the MPU into a streaming data packet by adding header information, wherein the MPU includes media data corresponding to at least one of audio, video and data and metadata for decoding and playing the media data; and transmitting the streaming data packet to the user terminal.

Additionally, in order to accomplish the above objects, an apparatus for providing network-adaptive content according to the disclosure includes a media processing module configured to encapsulate multimedia data into a media processing unit (MPU) including media data corresponding to at least one of audio, video and data and metadata for decoding and playing the media data; and a transmission processing module configured to packetize the MPU into a streaming data packet including a header. In the apparatus, the transmission processing module is further configured to identify a type of a communication network connected to a user terminal, and to set media transmission parameters for encapsulation of the media processing module and packetization of the transmission processing module, depending on the identified network type.

The network-adaptive content providing technique according to the disclosure may be applied to a content transmission system, especially, a streaming server, in which multimedia data such as live broadcast content or video on demand (VOD) is transmitted in a streaming manner and played back in real time.

The disclosure allows streaming content to be provided to a user terminal in view of a difference in transmission quality of communication networks by analyzing a source address of a signaling message transmitted to the user terminal, identifying the type of a communication network accessed by the user terminal, differently setting media transmission parameters for encapsulation and packetization in accordance with the identified network type, and performing encapsulation and packetization in accordance with the set media transmission parameters.

Particularly, the disclosure may improve a service quality perceived by a subscriber while increasing the network transmission efficiency by adjusting the media transmission parameters such as an MPU size, an error correction size, and a frame rate, depending on the network type.

DETAILED DESCRIPTION

Hereinafter, embodiments of the disclosure will be described in detail with reference to the accompanying drawings. In the following description and the accompanying drawings, well-known functions or elements may not be described or illustrated in detail to avoid obscuring the subject matter of the disclosure. The same elements may be denoted by the same reference numerals throughout the drawings.

The terms and words used herein should not be construed as limited to ordinary or dictionary definition terms, but should be construed in light of the meanings and concepts consistent with the subject matter of the disclosure on the basis of the principle that the inventor can properly define his own disclosure as the concept of the term to describe it in the best way. It is therefore to be understood that embodiments disclosed herein are merely exemplary and various equivalents or modifications thereof are possible.

Additionally, the terms including expressions "first", "second", etc. are used for merely distinguishing one element from other elements but do not limit the corresponding elements. The above expressions do not limit the sequence and/or importance of the elements.

Further, when it is stated that a certain element is "coupled to" or "connected to" another element, the element may be logically, electrically or physically coupled to or connected to another element. Namely, the element may be directly coupled or connected to another element, or a new element may exist between both elements.

Also, the terms used in describing various embodiments of the disclosure are only examples for describing a specific embodiment but do not limit such embodiments. Singular forms are intended to include plural forms unless the context clearly indicates otherwise. Unless defined differently, all terms used herein, which include technical terminologies or scientific terminologies, have the same meaning as that understood by a person skilled in the art to which the disclosure belongs. The terms "include", "comprise", and "have" as well as derivatives thereof, mean inclusion without limitation.

Now, a network environment to which a network-adaptive content providing technique according to the disclosure is applied will be described with reference to FIG. 1.

Figure 1:
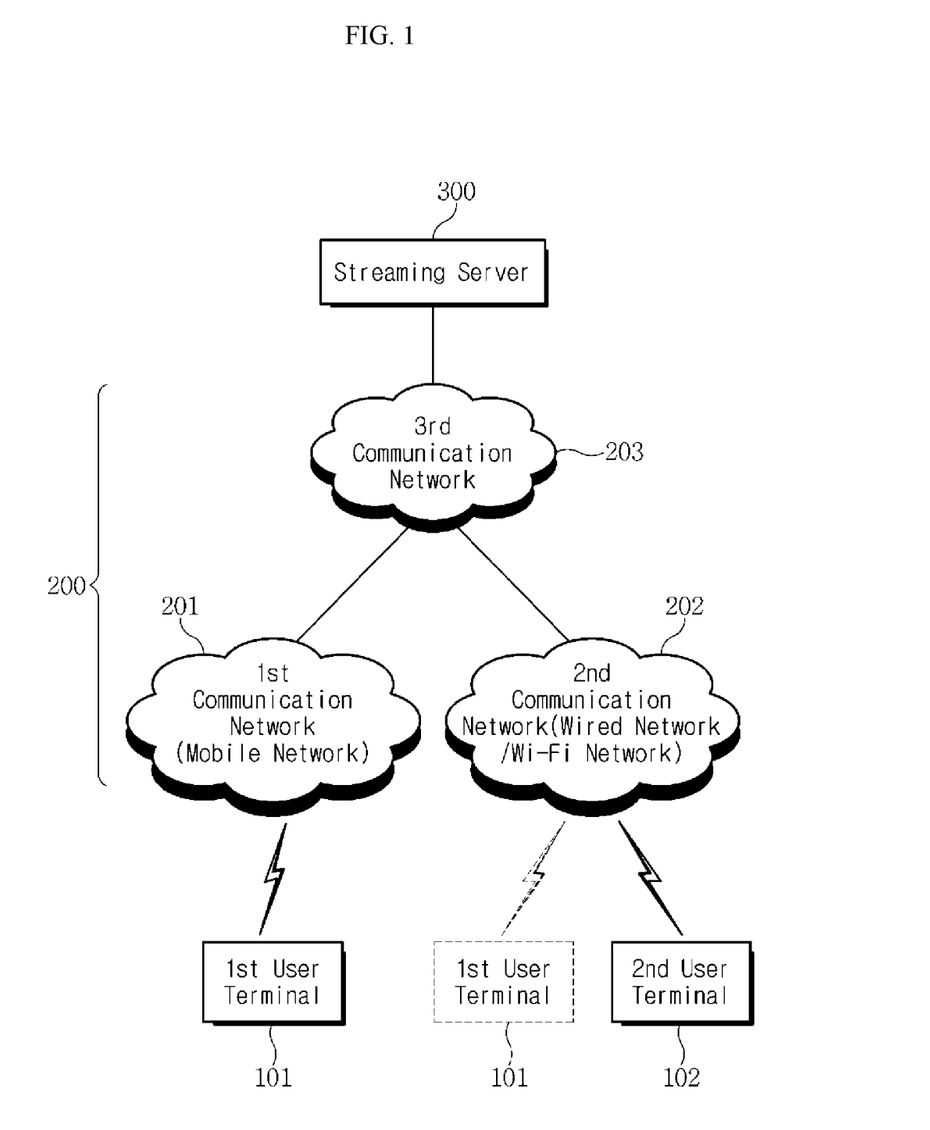
FIG. 1 is an exemplary diagram illustrating a network environment to which the disclosure is applied.

In FIG. 1, reference numerals 101 and 102 denote user terminals for receiving and playing contents. A reference numeral 200 denotes a communication network through which electronic data such as content data and signaling messages for content transmission are transmitted, and a reference numeral 300 denotes a streaming server for providing contents to the user terminals 101 and 102 in response to requests of the user terminals 101 and 102.

The user terminals 101 and 102 are configured to receive content through the communication network 200 and to play the received content. Specifically, each of the user terminals 101 and 102 accesses the communication network 200, connects a session for communication, sends a request for streaming of specific content to the streaming server 300 through the session, receives streaming data of the specific content from the streaming server 300, and performs playback of the streaming data.

The user terminals 101 and 102 may be implemented by any electronic device capable of transmitting and receiving various kinds of data via the network in response to a user's key manipulation. For this, each of the user terminals 101 and 102 may have a computing environment such as a memory for storing various kinds of programs and protocols, a microprocessor for executing and controlling the programs, and the like, and may perform the above-mentioned functions by executing a certain application program or program module based on the computing environment.

For example, each of the user terminals 101 and 102 may be one of a tablet PC, a laptop, a personal computer (PC), a smart phone, a personal digital assistant (PDA), a smart TV, a mobile communication terminal, and the like.

The communication network 200 is defined as one or more data links for transmitting electronic data between computer systems and/or modules. The communication network 200 may be formed of a combination of two or more different-type communication networks.

For example, the communication network 200 may include wired/wireless communication networks such as a 3G mobile communication network, a 4G mobile communication network, a wireless local area network (WLAN), Wi-Fi, WiBro, WiMAX, a high speed downlink packet access (HSDPA), Ethernet, a digital subscriber line (DSL) or xDSL such as ADSL or VDSL, a hybrid fiber coaxial cable (HFC), a fiber to the curb (FTTC), and a fiber to the home (FTTH).

Hereinafter, the communication network 200 is distinctively referred to as the first communication network 201, the second communication network 202, and the third communication network 203, based on an apparatus connected thereto. Namely, the first and second communication networks 201 and 202 refer to communication networks to which the user terminals 101 and 102 are connected, and the third communication network 203 refer to a communication network to which the streaming server 300 is connected. Although it is shown that the streaming server 300 and the user terminals 101 and 102 are connected to different communication networks, the streaming server 300 may be connected to the same communication network as the user terminals 101 and 102 are connected.

The first and second communication networks 201 and 202 are implemented on the basis of different communication schemes. In the first embodiment, the first communication network 201 may mean one communication network to which the first user terminal 101 is connected, whereas the second communication network 202 may mean another communication network to which the second user terminal 102 is connected. In the second embodiment, the first and second communication networks 201 and 202 may mean respective communication networks to which the same user terminal 101 is connected previously and currently.

For example, the first communication network 201 may be a mobile communication network formed of a plurality of radio access networks and a core network. Here, the radio access network which is a network for performing wireless communication with the user terminal 101 may include a plurality of base stations (BSs), also referred to as a base transceiver station (BTS), Node B, or evolved Node B (eNB), and controllers referred to as a base station controller (BSC) or a radio network controller (RNC). In addition, a digital signal processor and a radio signal processor, which are normally implemented with the base station, may be separated as a digital unit (DU) and a radio unit (RU). Then a plurality of RUs may be disposed respectively at a plurality of regions and connected to a centralized DU.

The core network which forms a mobile communication network together with the radio access networks performs a function to connect the access networks to an external network such as Internet. The core network performs circuit switching or packet switching and also manages and controls a packet flow in the mobile network. Additionally, the core network may manage mobility between frequencies, control traffic therein and in the access networks, and control interworking with other network such as Internet. The core network may include a serving gateway (SGW), a packet data network (PDN) gateway (PGW), a mobile switching center (MSC), a home location register (HLR), a mobile mobility entity (MME), a home subscriber server (HSS), and/or the like.

Meanwhile, the second communication network 202 may be Internet which is a public communication network in which information is exchanged according to the TCP/IP protocol, or a Wi-Fi network which is constructed of wireless access points (APs) and performs wireless communication with the user terminal 102 located within the communication coverage through the APs. The third communication network 203 may be Internet.

Finally, the streaming server 300 is configured to provide, in a streaming manner, contents to one or more user terminals 101 and 102 on the basis of the communication network 200.

Here, streaming is a technique of dividing a multimedia file such as music or video into a plurality of streaming data and transmitting them in sequence to allow a continuous playback of streaming data. By allowing playback together with download, streaming can reduce a user's waiting time and also provide contents in real time or live broadcast contents.

The streaming server 300 may operate using one or more of data transport and control protocols such as a real-time transport protocol (RTP), a real-time transport control protocol (RTCP), a real time messaging protocol (RTMP), a real time streaming protocol (RTSP), an HTTP live streaming, an MPEG-TS, and an MPEG media transport (MMT), based on a transport layer protocol such as a user datagram protocol (UDP) and a transmission control protocol (TCP).

In an embodiment of the disclosure, the streaming server 300 operates based on the MMT technology proposed as the first part of MPEG-H.

In accordance with the MMT technology, the streaming server 300 of the disclosure encapsulates pure media data of multimedia data and metadata including information for decoding and playing the multimedia data in units of media processing unit (MPU), packetizes the MPU, and continuously transmits packets to the user terminals 101 and 102. Particularly, the streaming server 300 of the disclosure recognizes the type of the communication network to which each user terminal 101 or 102 is connected, sets media transmission parameters affecting a media transmission quality depending on the recognized network type, and performs encapsulation and packetization of the multimedia data by applying the set media transmission parameters.

For the above, the streaming server 300 may include a network-adaptive content providing apparatus which will be described below.

Now, the configuration and operation of the network-adaptive content providing apparatus to be applied to the streaming server 300 to implement the above-discussed embodiments will be described.

Figure 2:
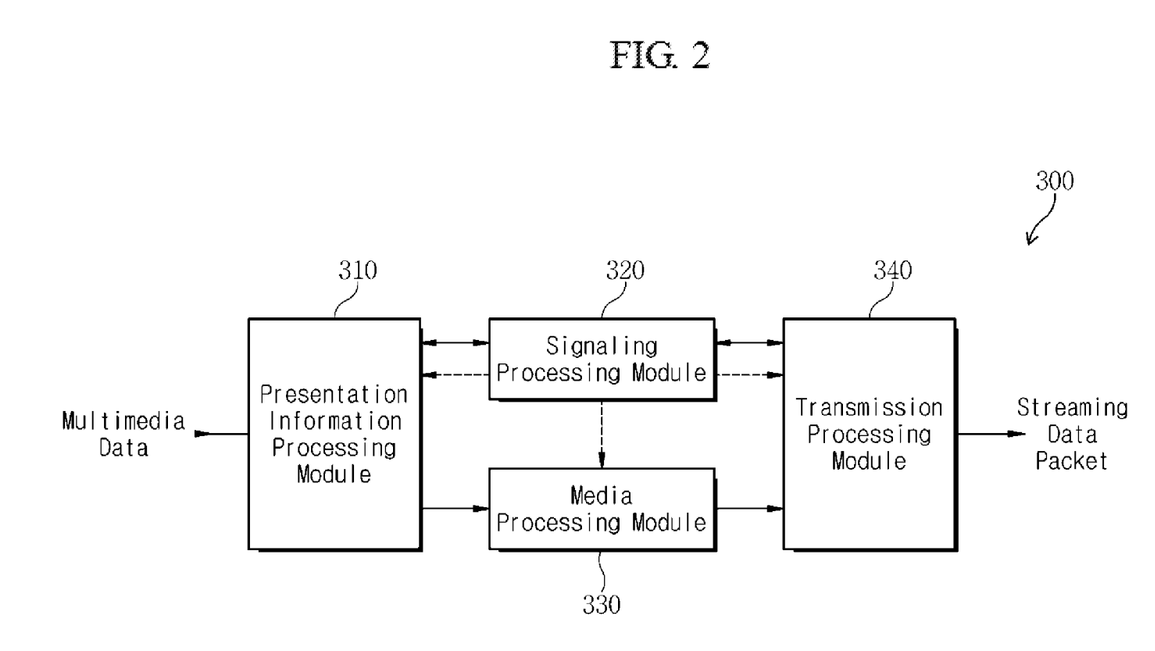
FIG. 2 is a block diagram illustrating a network-adaptive content providing apparatus according to an embodiment of the disclosure.

FIG. 2 is a block diagram illustrating a network-adaptive content providing apparatus according to an embodiment of the disclosure.

Referring to FIG. 2, the network-adaptive content providing apparatus may include a presentation information processing module 310, a signaling processing module 320, a media processing module 330, and a transmission processing module 340.

Here, the term 'module' refers to an element that performs a particular function, and may be implemented by hardware, software, or a combination thereof. For example, the 'module' may refer to a program module, which is stored in a memory of the streaming server 300 and then executed by a processor to perform a predetermined function according to the disclosure. Normally the program module includes routines, programs, objects, components, data structures, and the like that perform particular tasks or implement particular abstract data types.

The presentation information processing module 310 receives service-requested multimedia data, divides the multimedia data into a plurality of entities, and creates presentation information for defining a time and a location for playback of the plurality of entities. In MMT, the entity is named an asset. For example, one piece of multimedia data may be divided into time entities such as audio assets and video assets and non-time entities such as subtitle assets. In addition, the presentation information processing module 310 may further create asset delivery characteristics (ADC) which are QoS related requests for smooth transmission of an asset. The ADC which is characteristic information of an asset together with QoS requirements may include, with regard to each asset, information about tolerance for a packet loss, information about sensitivity to jitter, information about the maximum buffer size required for asset reception, and the like.

In addition, the presentation information may include, as time information, a media processing unit (MPU) timestamp descriptor that contains playback time information of a network time protocol (NTP) based MPU, and as the spatial information, composition information (CI) that is high-level presentation information including information about a playback space of the asset. Besides, the presentation information may include media presentation description (MPD) defined in ISO/IEC 23009-1.

The signaling processing module 320, which is configured to process a message for consumption and delivery of multimedia data, analyzes a signaling message transmitted from the user terminal 101 or 102, recognizes a request of the user terminal 101 or 102, and processes a corresponding response. The message processed by the signaling processing module 320 may include a package access (PA) message for transmitting information necessary for playback of multimedia data, a media presentation information (MPI) message for providing presentation information, an MMT package table (MPT) message for transmitting asset information of a package, an ADC message for transmitting the ADC, and the like.

In an embodiment, the signaling processing module 320 receives a streaming request message and provides information of requested multimedia data to the presentation information processing module 310. Then, according to a signaling procedure, the signaling processing module 320 transmits the presentation information, the ADC, and the asset information to the user terminal 101 or 102 by sending designated messages in sequence.

The media processing module 330 divides each asset received from the presentation information processing module 310 into a plurality of fragments according to predetermined media transmission parameters and encapsulates the fragments into one or more MPUs. The MPU is a physical file that conforms to the ISO-based media file format, and is a media data file that contains various metadata and can be independently processed. One or more MPUs created in the same asset share the same asset ID. Particularly, in the disclosure, the media processing module 330 differently sets the media transmission parameters (especially, an MPU size, a frame rate) depending on the type of the communication network to which the user terminal 101 or 102 is connected, and performs encapsulation to apply the differently set media transmission parameters.

The transmission processing module 340, which is configured to process data transmission with the user terminal 101 or 102, attaches a header to the signaling message processed by the signaling processing module 320 and to the MPU encapsulated by the media processing module 330 so as to create a packet, and transmits the created packet to the user terminal 101 or 102. In addition, the transmission processing module 340 receives a packet from the user terminal 101 or 102, extracts a signaling message by analyzing a header of the received packet, and provides the extracted signaling message to the signaling processing module 320.

Particularly, in the disclosure, if an analysis result of the header of the packet received from the user terminal 101 or 102 indicates a signaling message, the transmission processing module 340 analyzes a source address of the signaling message, i.e., the source address recorded in the header of the packet, thereby recognizes the type of the communication network connected to the user terminal 101 or 102, and notifies the recognized network type to the media processing module 330. Further, the transmission processing module 340 sets the media transmission parameters (especially, an error correction size) depending on the recognized network type, calculates an error correction code by applying the media transmission parameters, and forms a packet including the error correction code.

Figure 3:
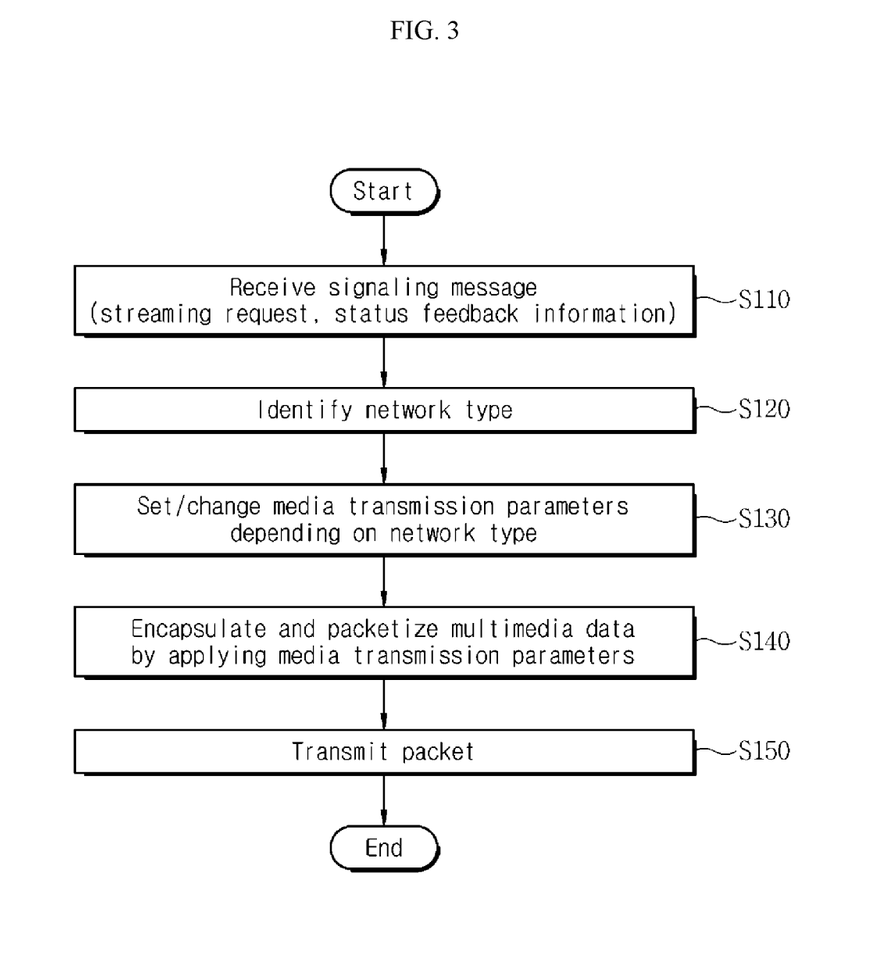
FIG. 3 is a flow diagram illustrating a network-adaptive content providing method performed by a network-adaptive content providing apparatus according to an embodiment of the disclosure.

FIG. 3 is a flow diagram illustrating a network-adaptive content providing method performed by a network-adaptive content providing apparatus according to an embodiment of the disclosure. Through this, the operation of the network-adaptive content providing apparatus of the disclosure can be understood more easily.

Referring to FIGS. 2 and 3, at step S110, the network-adaptive content providing apparatus of the disclosure may receive a signaling message related to the provision of content from the user terminal 101 or 102. The signaling message may include a streaming request message and/or a status feedback information message.

At this step S110, the transmission processing module 340 may receive a packet from the user terminal 101 or 102, analyze a header of the received packet, and determine whether the packet is a signaling message.

If the signaling message is received, the network-adaptive content providing apparatus of the disclosure checks a source address of the signaling message, i.e., the source address of the received packet, at step S120 and thereby identifies the type of the communication network connected to the terminal 101 or 102 that transmits the signaling message. At this step S120, the transmission processing module 340 may extract the source address of the received packet and then identify the network type by comparing the extracted source address with a range of IP address distributed according to communication service providers or network types.

Next, at step S130, the network-adaptive content providing apparatus of the disclosure sets media transmission parameters depending on the identified network type. At this step S130, the transmission processing module 340 may notify the identified network type to the media processing module 330, and then the media processing module 330 and the transmission processing module 340 may set the media transmission parameters for encapsulation and packetization, respectively. Here, the media processing module 330 may set the MPU size and the frame rate, and the transmission processing module 340 may set the error correction size. The MPU size may be set as the maximum transfer unit (MTU) supported in the identified network type. For this, the network-adaptive content providing apparatus may identify an MTU size supported in the network connected to the user terminal 101 or 102 by performing an MTU discovery (or MTU negotiation) procedure with the user terminal 101 or 102 before setting the MPU size. In another embodiment, the network-adaptive content providing apparatus may set in advance MTU size information for each network type and then, if the network type is identified, set the MTU size corresponding to the identified network type to the MPU size. Adjusting the MPU size through the MTU size of the network may prevent fragmentation in network equipment, thereby improving the transmission efficiency.

In addition, at step S140, the network-adaptive content providing apparatus of the disclosure performs encapsulation and packetization of the requested multimedia data by applying the set media transmission parameters. Specifically, at this step S140, the media processing module 330 divides each asset received from the presentation information processing module 310 into a plurality of fragments, based on the media transmission parameters (i.e., the MPU size and the frame rate) and then encapsulates the fragments into the MPUs. Also, the transmission processing module 340 calculates an error correction code for each MPU by applying the media transmission parameters (i.e., the error correction size) and then packetizes the MPU by creating a header including the error correction code.

In addition, at step S150, the network-adaptive content providing apparatus of the disclosure transmits a streaming data packet created through packetization to the user terminal 101 or 102.

This network-adaptive content providing method of the disclosure will be described in more detail with reference to embodiments shown in FIGS. 4 and 5.

Figure 4:
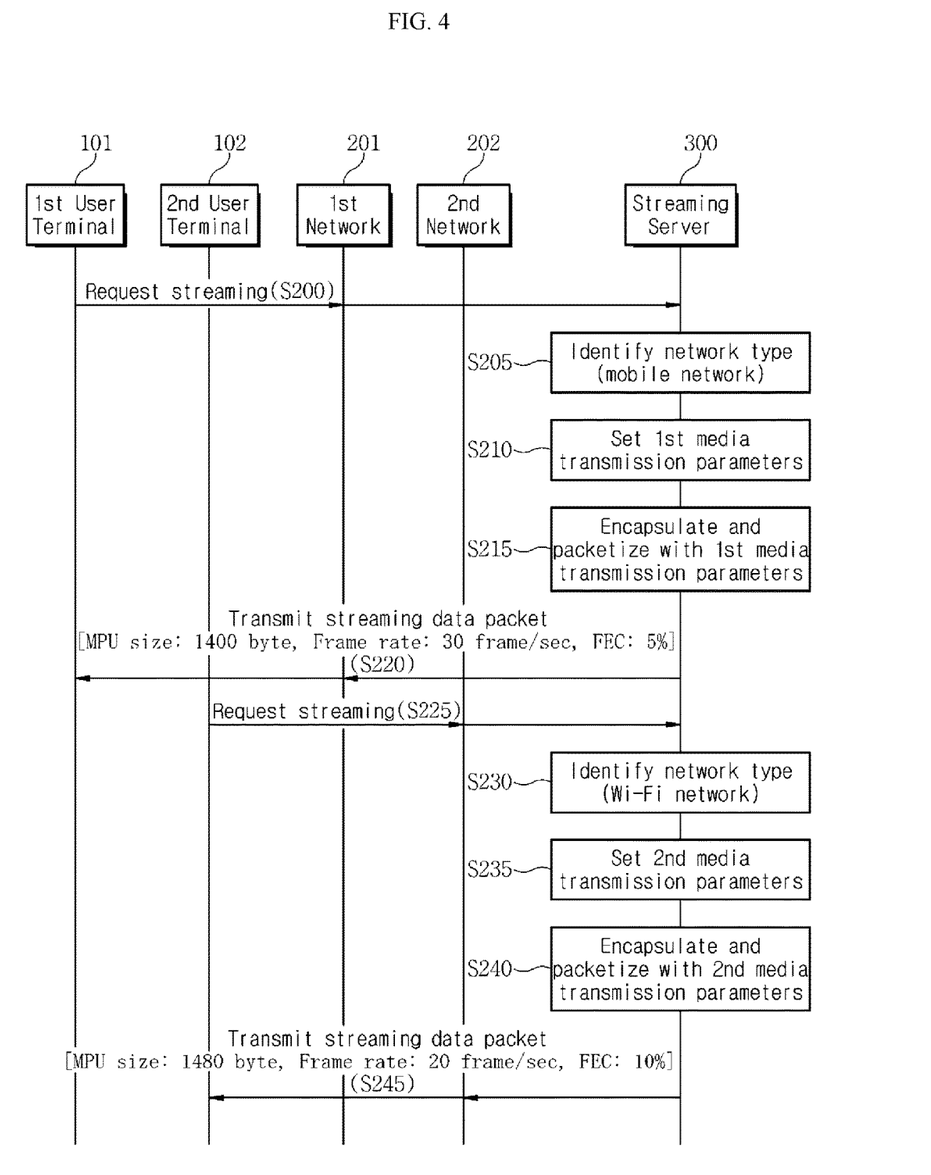
FIG. 4 is a flow diagram illustrating a network-adaptive content providing process, in the network environment shown in FIG. 1, according to the first embodiment of the disclosure.

FIG. 4 is a flow diagram illustrating a network-adaptive content providing process, in the network environment shown in FIG. 1, according to the first embodiment of the disclosure. In the first embodiment, it is assumed that the user terminals 101 and 102 access the streaming server 300 through different types of communication networks. Specifically, it is assumed that the first communication network 201 connected to the first user terminal 101 is a mobile communication network, and the second communication network 202 connected to the second user terminal 102 is a Wi-Fi network.

In this situation, each of the user terminals 101 and 102 may transmit a streaming request to the streaming server 300 at steps S200 and S225. Such streaming requests may be sent simultaneously from a plurality of user terminals in the same time zone or in different time zones. Additionally, the streaming request is transmitted in accordance with TCP/IP or UDP/IP and includes, as a source address, an IP address assigned to each of the user terminals 101 and 102. The IP addresses assigned to the user terminals 101 and 102 are allocated in the first and second communication networks 201 and 203 to which the user terminals 101 and 102 are connected respectively. The IP addresses are distinguished by class according to bands, and the first decimal part among four parts of the IP address ranges differently for each class. For example, class A ranging from 0 to 127 is used for a large-scale network environment, class B ranging from 128 to 191 is used for a medium-scale network environment, class C ranging from 192 to 223 is used for a small-scale network environment, classes D and E using other numbers after 223 are IP addresses for research and development. These IP addresses are distributed to respective communication service providers (e.g., mobile communication providers, wired network providers, etc.), each of which assigns IP addresses to the user terminals 101 and 102 connected to the communication network thereof within an available address range.

The streaming server 300 that receives the streaming request of the user terminal 101 or 102 identifies, at steps S205 and S230, the type of the communication network connected to the user terminal 101 or 102 that transmits the streaming request. As described above, the IP address of the user terminal 101 or 102 is allocated in the communication network to which the user terminal 101 or 102 is connected. Therefore, by checking the IP address, it is possible to identify the type of the communication network connected to the user terminal 101 or 102.

After the network type is identified, the streaming server 300 sets media transmission parameters according to the identified network type at steps S210 and S235.

The media transmission parameters are parameters for setting encapsulation and packetization conditions in connection with a transmission quality of content and a playback quality of content. Here, the encapsulation means dividing multimedia data into a plurality of fragments according to a given rule and creating a predetermined data unit, e.g., an MPU defined in the MMT. In addition, the packetization means constructing an MMT packet processable in the transport layer by adding a header to the MPU as defined in the MMT. When the streaming server 300 transmits streaming data according to the MMT technology, the media transmission parameters may include an MPU size [byte], a frame rate [frame/sec], and an error correction size [%].

The MPU size corresponds to a payload of a packet, and in the disclosure, the MPU size is set as an MTU allowed in the network. For this, before setting the media transmission parameters, an MTU discovery (or MTU negotiation) procedure may be performed with the user terminal 101 or 102 and thereby identify an MTU size supported in the network connected to the user terminal 101 or 102 or set MTU size information for each network type. In addition, the streaming server 300 may set the media transmission parameters in consideration of a transmission quality according to the type of the communication network. For example, the streaming server 300 sets the first media transmission parameters if the network type is a mobile communication network (e.g., LTE or the like), and sets the second media transmission parameters if the network type is a Wi-Fi network or a wired network. In this case, the first media transmission parameters may be set as an MPU size of 1400 bytes, a frame rate of 30 frames/sec, and an error correction size of 5%, whereas the second media transmission parameters may be set as an MPU size of 1480 bytes, a frame rate 20 frames/sec, and an error correction size of 10%. Namely, in case of the mobile communication network capable of guaranteeing the transmission quality, the media transmission parameters are set to ensure a sufficient image quality by increasing the frame rate instead of reducing the error correction size. On the other hand, in case of the Wi-Fi network incapable of the transmission quality, an image quality is reduced to guarantee a seamless stable service by relatively reducing the frame rate instead of increasing the error correction size.

When the media transmission parameters are set, the streaming server 300 performs the encapsulation and packetization of the requested multimedia data by applying the media transmission parameters at steps S215 and S240. Then, the streaming server 300 transmits a created streaming data packet to the corresponding user terminal 101 or 102 at steps S220 and S245.

Figure 5:
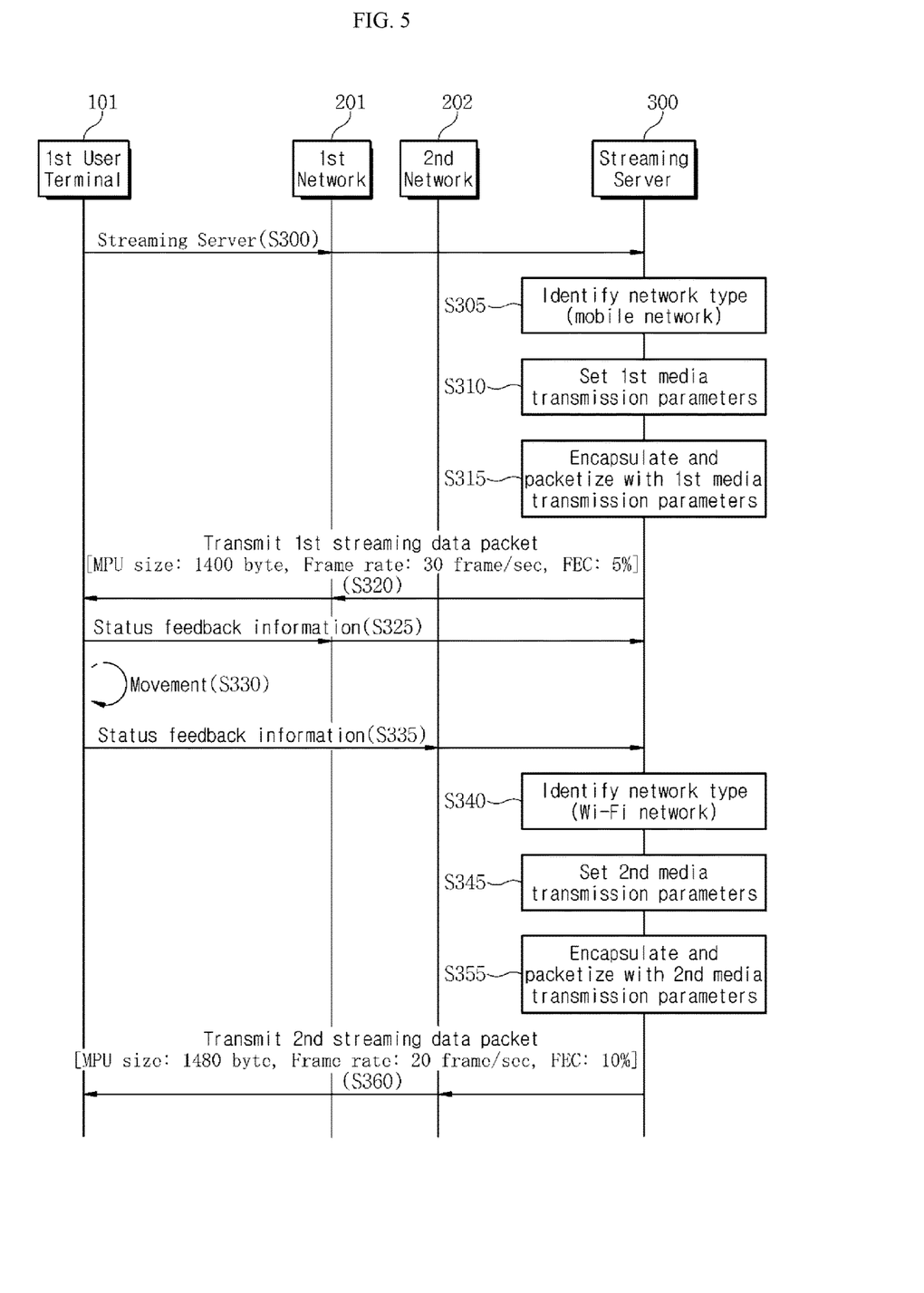
FIG. 5 is a flow diagram illustrating a network-adaptive content providing process, in the network environment shown in FIG. 1, according to the second embodiment of the disclosure.

FIG. 5 is a flow diagram illustrating a network-adaptive content providing process, in the network environment shown in FIG. 1, according to the second embodiment of the disclosure.

In the second embodiment of the disclosure, it is assumed that the user terminal 101 moves to the second communication network 202 while receiving content from the streaming server 300 via the first communication network 201. It is also assumed that the first communication network 201 connected to the user terminal 101 before the movement is the mobile communication network and the second communication network 202 connected after the movement is the Wi-Fi network.

Namely, in a state of being connected to the first communication network 201, the user terminal 101 may send a streaming request for specific multimedia content to the streaming server 300 at step S300. At this time, the user terminal 101 transmits the streaming request by using, as a source address, an IP address allocated in the first communication network 201.

As in the first embodiment, based on the source address from which the streaming request is transmitted, the streaming server 300 identifies at step S305 the type of the communication network connected to the user terminal 101 that requests streaming.

Then, at step S310, the streaming server 300 sets the first media transmission parameters according to the identified network type. Since the user terminal 101 is currently connected to the first communication network 201 which is a mobile communication network, the user terminal 101 sets the first media transmission parameters corresponding to the mobile communication network.

Additionally, the streaming server 300 encapsulates and packetizes requested multimedia data by applying the first media transmission parameters at step S315, and transmits a created streaming data packet to the user terminal 101 at step S320. The streaming data packet is transmitted to the user terminal 101 through the first communication network 201. For example, the first streaming data packet is created with an MPU size of 1400 bytes, a frame rate of 30 frames/sec, and an error correction size of 5%.

Thereafter, the user terminal 101 stores the received first streaming data packet in a buffer. Then the user terminal 101 decapsulates and decodes the stored first streaming data packet to restore it to the original video/audio data for playback.

In addition, the user terminal 101 monitors a streaming status, especially, a buffer status, and periodically transmits status feedback information related to the streaming status to the streaming server 300 at step S325. At this time, the status feedback information may include buffer status information and may be transmitted through a network aware message defined in the MMT. This signaling message is also transmitted on an IP basis, and includes the IP address of the user terminal 101 as a source address.

The streaming server 300 that receives the status feedback information checks the status of the user terminal 101 and performs a corresponding process. Also, the streaming server 300 may identify the source address from which the status feedback information is transmitted, and thereby determine whether the communication network connected to the user terminal 101 is changed.

Meanwhile, the user terminal 101 may change the connection from the first communication network 101 to the second communication network 102 at step S330 while receiving and playing the multimedia data real time. For example, while receiving and playing the multimedia data, the user terminal 101 may perform a connection procedure with the second communication network 102 according to a user's manipulation or through an automatic search function. At this time, the user terminal 102 has an IP address allocated in the second communication network 102.

Then, when the user terminal 101 transmits the status feedback information to the streaming server 300 at step S335, the source address from which the status feedback information is transmitted becomes the IP address allocated in the second communication network 102.

Therefore, when identifying the type of the communication network connected to the user terminal 101 at step S340, based on the source address of the received status feedback information, the streaming server 300 recognizes that the communication network connected to the user terminal 101 is changed to the Wi-Fi network.

Then, at step S345, the streaming server 300 sets the second media transmission parameters corresponding to the Wi-Fi network. For example, the second media transmission parameters include an MPU size of 1480 bytes, a frame rate of 20 frames/sec, and an error correction size of 10%. Thereafter, the streaming server 300 encapsulates and packetizes data to be transmitted by applying the second media transmission parameters at step S355, and transmits a created second streaming data packet to the user terminal 101 at step S360. At this time, the second streaming data packet is transmitted to the user terminal 101 through the second communication network 202.

Step S355 and step S360 are repeated until the communication network to which the user terminal 101 is connected is changed again.

Figure 6:
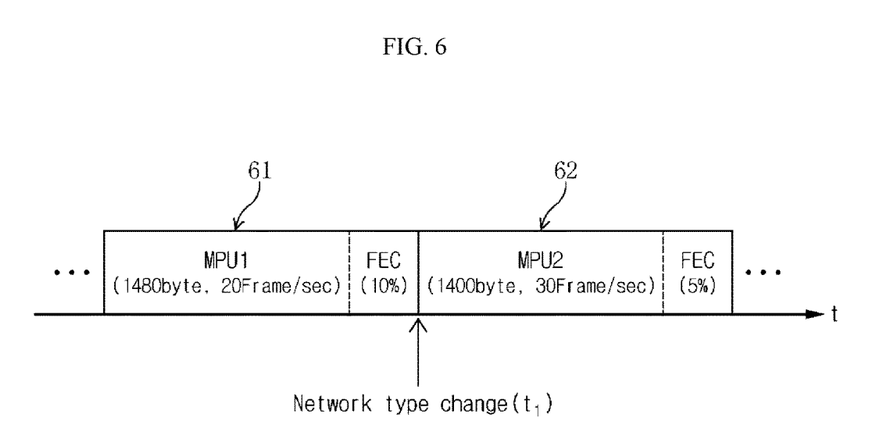
FIG. 6 is a timing diagram illustrating a steaming data packet provided by the network-adaptive content providing process according to the second embodiment of the disclosure.

FIG. 6 is a timing diagram illustrating a steaming data packet transmitted to the user terminal 101 on the time axis according to the second embodiment of the disclosure. While the user terminal 101 is connected to the first communication network 201, the streaming server 300 constructs and transmits the requested multimedia data as the first streaming data packet 61 that includes an MPU having a size of 1480 bytes and a frame rate of 20 frames/sec and an error correction code (also referred to as a forward error correction (FEC)) of 10%.

If the user terminal 101 moves to the second communication network 202 and thereby the network type is changed at a certain time point (t1), the streaming server 300 constructs and transmits the same multimedia data as the second streaming data packet 62 that includes an MPU having a size of 1400 bytes and a frame rate of 30 frames/sec and an error correction code (FEC) of 5%.

In this case, the MPU includes metadata such as codec composition information for decoding and playing media data together with pure media data (MFU) such as audio, video and data, thus being independently decoded and played.

According to the above-discussed first and second embodiments, the streaming server 300 of the disclosure can provide a streaming data packet adapted to a transmission quality of each network type in a network environment in which various types of communication networks coexist. As a result, the streaming server 300 can guarantee a stable and seamless service.

Hereinbefore, while the disclosure has been particularly shown and described with reference to exemplary embodiments thereof, it is evident that many alternatives, modifications and variations will be apparent to and can be readily made by those skilled in the art without departing from the scope of the disclosure as defined in the appended claims. Furthermore, although specific terms have been used in the disclosure, they are used in a generic sense only to facilitate the description of the disclosure and to facilitate understanding of the disclosure, and are not intended to limit the scope of the disclosure.

In addition, the streaming server 300 or the user terminal 101 or 102 according to the disclosure may be equipped with a computing system including a processor and a memory and execute functions described in the above embodiments through the computing system. Here, the processor can process program commands for executing functions according to the disclosure, and the program commands can be stored in the memory. In one implementation, the processor may be a single-threaded processor, and in another embodiment, the processor may be a multithreaded processor.

Meanwhile, the memory equipped in the streaming server 300 or the user terminal 101 or 102 according to the disclosure stores information therein. The memory is a non-transitory computer-readable recording medium. The memory may be a volatile memory unit in one implementation and may be a non-volatile memory unit in another embodiment. In some implementations, the program commands for executing functions according to embodiments of the disclosure may be stored in a non-transitory computer-readable storage medium such as a hard disk device, an optical disk device, or any other mass storage device.

The program commands for executing functions according to embodiments of the disclosure may include analyzable commands such as script commands (e.g., JavaScript or ECMAScript), executable codes, or other commands recorded in a non-transitory computer-readable medium. These may be executed in a distributed system environment in which program modules may be distributedly stored in local and remote storage devices.

Although this description and drawings illustrate exemplary device elements, the subject matters and functional operations disclosed herein may be implemented by different type digital electronic circuits or implemented by computer software, firmware or hardware including a structure disclosed herein and structural equivalent thereof, or any combination thereof. The subject matters disclosed herein may be implemented by at least one computer program product, namely at least one module regarding computer program commands encoded on a program storage medium so as to control the operation of a device according to the disclosure or allow execution thereby. A non-transitory computer-readable medium may be a machine-readable storage device, a machine-readable storage board, a memory device, a machine-readable composition of material affecting wave-type signaling, or a combination thereof.

In the disclosure, the term "system" is used to mean all apparatuses, devices and machines for processing data, including, for example, a programmable processor, a computer, or a multiprocessor. The system may include a code that forms an execution environment for a computer program upon request, such as a processor firmware, a protocol stack, a database management system, an operating system, or a combination thereof.

While the disclosure contains many specific implementation details, these should not be construed as limitations on the scope of the disclosure or of what may be claimed, but rather as descriptions of features that may be specific to particular embodiments of particular disclosure. Certain features that are described in the disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Although operations are illustrated as being performed in a predetermined order in the drawings, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

The disclosure has described specific embodiments of the disclosure. Other embodiments are within the scope of the following claims. For example, the operations recited in the claims may be performed in a different order and still achieve desirable results. By way of example, the process illustrated in the accompanying drawings does not necessarily require that particular illustrated sequence or sequential order to obtain desired results. In certain implementations, multitasking and parallel processing may be advantageous.

The description sets forth the best mode of the disclosure, and is provided to illustrate the disclosure and to enable those skilled in the art to make and use the disclosure. The written description is not intended to limit the disclosure to the specific terminology presented. Therefore, while the disclosure has been described in detail with reference to the above examples, those skilled in the art will be able to make adaptations, modifications, and variations on these examples without departing from the scope of the disclosure.

Accordingly, the scope of the disclosure should not be limited by the described embodiments but should be defined by the appended claims.

What is claimed is:

1. A non-transitory computer-readable recording medium having a program recorded therein for providing network-adaptive content, the program, executed by a processor including electronic circuits, comprising steps of:
   identifying whether types of communication networks, to which each of one or more user terminals connected, are same or different, when multimedia data are respectively sent to the user terminals each connected through one or more communication networks;
   setting media transmission parameters used for encapsulation and packetization of the multimedia data, depending on the identified network types of the communication networks to thereby adaptively create the network-adaptive content for the multimedia data, to be provided with the user terminals, considering a media transmission quality of the respective communication networks;
   encapsulating the multimedia data into a media processing unit (MPU) by applying the media transmission parameters and packetizing the MPU into a streaming data packet by adding header information, wherein the MPU includes media data corresponding to at least one of audio, video and data and metadata for decoding and playing the media data; and
   transmitting the streaming data packet to the user terminal.

2. The non-transitory computer-readable recording medium of claim 1, wherein the step of identifying the network types includes analyzing a source address of a signaling message transmitted from the user terminals and identifying the network types through the source address.

3. The non-transitory computer-readable recording medium of claim 2, wherein the signaling message includes at least one of a streaming request message for requesting specific multimedia data and a status feedback information message for periodically notifying a buffer status and a network status.

4. The non-transitory computer-readable recording medium of claim 1, wherein the media transmission parameters include one or more of an MPU size, a frame rate, and an error correction size, wherein at least one of the MPU size, the frame rate or the error correction size is determined based on identifying whether the types of the communication networks to which each of the one or more user terminals connected are same or different.

5. An apparatus for providing network-adaptive content, comprising:
   a media processing circuit, implemented by a processor, configured to encapsulate multimedia data into a media processing unit (MPU) including media data corresponding to at least one of audio, video and data and metadata for decoding and playing the media data; and a transmission processing circuit, implemented by a processor, configured to packetize the MPU into a streaming data packet including a header, wherein the transmission processing circuit is further configured to identify whether types of communication networks, to which each of one or more user terminals connected, are same or different, when multimedia data are respectively sent to the user terminals each connected through one or more communication networks, and set media transmission parameters used for encapsulation packetization of the multimedia data, depending on the identified network types of the communication networks to thereby adaptively create the network-adaptive content for the multimedia data, to be provided with the user terminals, considering a media transmission quality of the respective communication networks.

6. The apparatus of claim 5, wherein the transmission processing circuit is further configured to analyze a source address of a signaling message transmitted from the user terminals so as to identify the network type through the source address.

7. The apparatus of claim 6, wherein the signaling message includes at least one of a streaming request message for requesting specific multimedia data and a status feedback information message for periodically notifying a buffer status and a network status.

8. The apparatus of claim 5, wherein the media transmission parameters include one or more of an MPU size, a frame rate, and an error correction size, wherein at least one of the MPU size, the frame rate or the error correction size is determined based on identifying whether the types of the communication networks to which each of the one or more user terminals connected are same or different.

* * * * *